April 23, 1929.   H. D. CROFT   1,710,349
METHOD OF LAYING OUT GEARS
Filed March 29, 1928
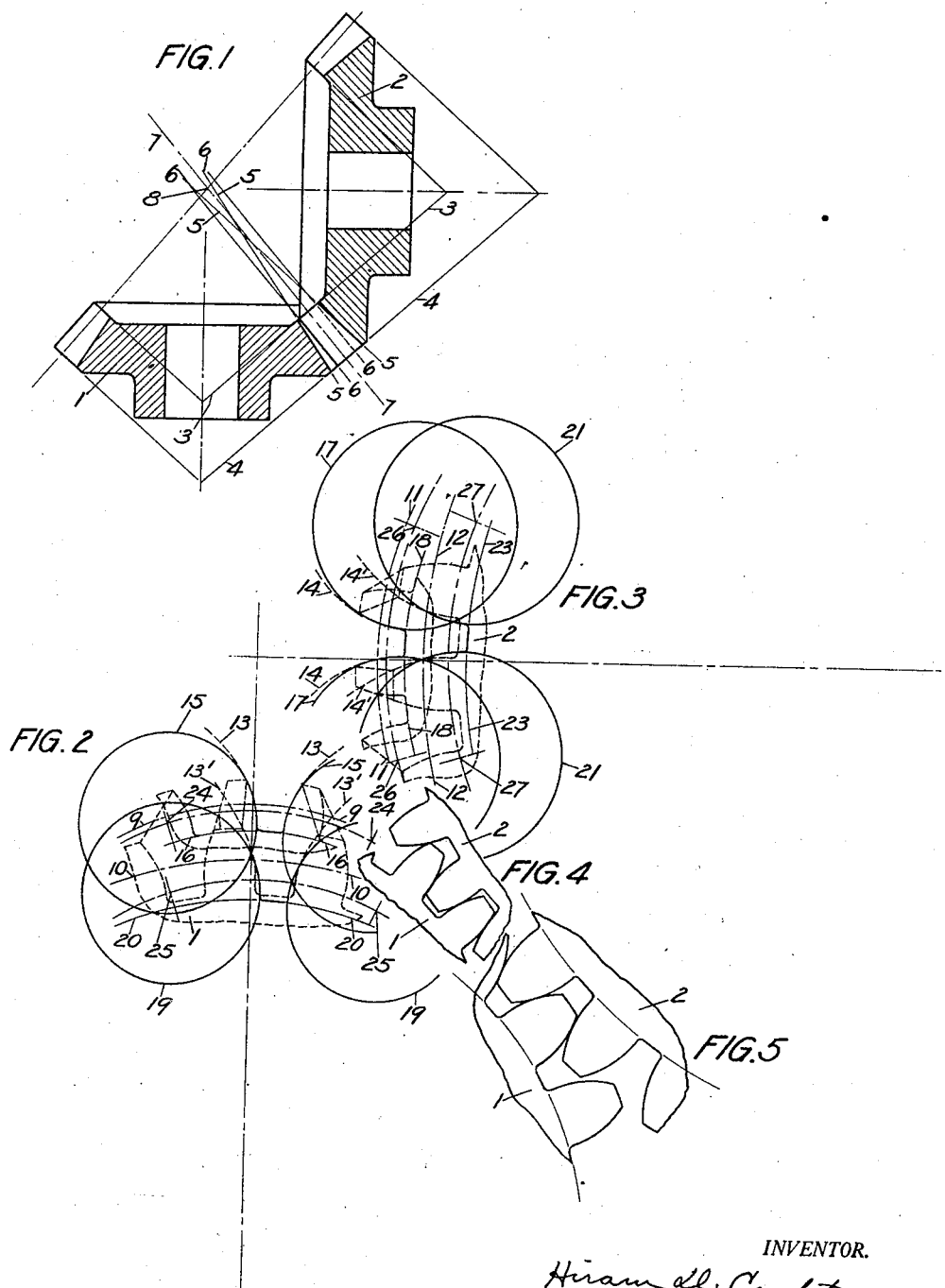
INVENTOR.
Hiram D. Croft,
BY
Frank A. Cutter,
ATTORNEY.

Patented Apr. 23, 1929.

1,710,349

UNITED STATES PATENT OFFICE.

HIRAM D. CROFT, OF SPRINGFIELD, MASSACHUSETTS, ASSIGNOR TO PERKINS MACHINE AND GEAR COMPANY, OF WEST SPRINGFIELD, MASSACHUSETTS, A CORPORATION OF MASSACHUSETTS.

METHOD OF LAYING OUT GEARS.

Application filed March 29, 1928. Serial No. 265,746.

My invention relates to improvements in methods of laying out bevel gears for cutting with single-cut tools, such as those of the broaching or milling type; and the primary object is to enable bevel gears to be produced by the single-cut process, which gears very closely approximate those having true generated teeth, whereby a great saving results in time, labor, and expense.
This method of laying out a bevel gear, which gear may be of any size and have any number of teeth, is simple and can be put into practice without the exercise of a great amount of skill beyond that required in laying out the generated tooth in the first instance and as a first or preliminary step in my method.

Although there are various methods of and means for cutting bevel gears having true generated teeth, the process is always more or less involved and entails large expense, and efforts have been made from time to time to obtain bevel gears the teeth of which so closely approximate generated teeth as to render such gears useful for a great many purposes, with greater or less success. With my method I obtain results which are dependable, uniformly satisfactory, and highly efficient.

Other objects and advantages will appear in the course of the following description.

I attain the objects and secure the advantages of my invention in the manner described in detail below.

The accompanying drawings, in which like reference characters designate like parts throughout the several views, are supplied to aid in an understanding of the method, and in said drawings—

Figure 1 is a section through two intermeshing bevel gears which are concrete examples of the result of my method applied in the laying out of the same, one of said gears being smaller than the other and therefore termed a pinion; Fig. 2, a diagrammatical view of a section of the pinion illustrating the method of laying out the teeth of the same; Fig. 3, a diagrammatical view of a section of the gear illustrating the method of laying out the teeth thereof; Fig. 4, a diagrammatical view of the intermeshing sections of said gear and pinion at the inner, front, or toe ends of the teeth, showing how said teeth, when laid out according to the new method, appear, and, Fig. 5, a view similar to Fig. 4 except that the same is taken at the outer, back, or heel ends of said teeth.

In the drawings the pinion is indicated by the numeral 1, and the gear by the numeral 2. These are merely suggestive of any pair of bevel gears, or of any associated bevel gear and bevel pinion, it being understood that the method is applicable to bevel gears and pinions of any size or sizes, and having any numbers of teeth.

In the first view, the inside back angle line is represented at 3—3, the outside back-angle line at 4—4, the cutting-angle line at 5—5, the face-angle line at 6—6, and the cone-angle line at 7—7. The cone-angle line 7 is common to both the pinion 1 and the gear 2, while each tooth of each of these members has a cutting-angle line 5 and a face-angle line 6, and they do not pass through the cone apex, indicated at 8, of said members, but those of the pinion and those of the gear cross and pass on opposite sides of said apex. The pinion cutting-angle and face-angle lines and the gear cutting angle and face-angle lines also cross the cone-angle line 7. Naturally there are or may be cases where the face angles of a gear and pinion, either or both, are other than those herein shown.

In Figs. 2 and 3, the theoretical generated tooth lines are dotted, while the reconstructed tooth lines, for single-cut teeth which are the objective of the new lay-out, are in full.

The pitch circles at the toe and heel ends of the pinion teeth are respectively represented at 9—9 and 10—10 in Fig. 2, and the pitch circles at the toe and heel ends of the gear teeth are respectively represented at 11—11 and 12—12 in Fig. 3.

Although the width of a tooth and the width of the space between two adjacent teeth on any pitch circle are usually the same or equal, there are, of course, cases where they are not the same or equal. The lay-out is applied to the tooth spaces.

At 13—13 are represented curves which form the outline at the toe end of a theoretically perfect, generated tooth slot, and at 13'—13' are represented curves which form the outline at the heel end of said slot, in the pinion 1, Fig. 2. Similarly, in Fig. 3, the curves, at the toe end of a theoretically perfect, generated tooth slot in the gear 2, are represented at 14—14, and the curves at the heel end of said slot are represented at 14'—14'.

Primarily to the first step in the method, or perhaps it better be termed the first step, the theoretically perfect generated outlines at the toe and heel ends of a tooth or of a tooth slot in the bevel gear or pinion to be cut, with a single-cut tool, are laid out in the usual manner, or according to the customary rules, as at 13 and 13', respectively, for the pinion 1, and at 14 and 14', respectively, for the gear 2. The outlines 13 and 13' and 14 and 14' here are involute curves, but such outlines might be cycloidal or other curves, or approximations of any or all of the same. Next, two comparatively small, outline circles, as 15—15 are found which approximate the tooth-forming portions of the involute curves 13, applied so that said circles pass through the points on the pitch circle 9 of the pinion through which the involute curves 13 pass. From the aforesaid points on the pitch circle to the full depth of the tooth slot, or to the total-depth circle represented at 16—16, the included portions of the small circles 15 outline a tooth, or, as has been explained, adjacent sides of two adjacent teeth, from said pitch circle to said full depth, and said small circles also outline the said sides beyond or outside of said pitch circle. Similarly two comparatively small circles 17 are applied at the toe end of a tooth slot in the gear 2, and portions of said circles outline the sides of said slot from the pitch circle 11 to the total-depth circle represented at 18—18 in Fig. 3. This full or total depth in each case is the same for both the generated and the approximated conditions, and said total depth is instrumental in determining the cutting angle of the single-cut tooth, which angle is determined by a line connecting the total depth of the tooth slot at the toe end with the low point or total depth of said slot at the heel end—see 5—5 in Fig. 1.

To determine the form of the tooth of the pinion at the heel end, two small, outline circles, as 19, each of which is of the same diameter as that of either circle 15, and the distance between centers of the circles in both pairs is the same, or in any event, the distance between centers of the circles 19 is never less than the distance between centers of the circles 15, are located over the involute curves 13' so that they intersect the pitch circle 10 at the points where said pitch circle is intersected by said involute curves, and said outline circles are connected by an arc of a circle parallel or concentric with the pitch circle, and having the same relation to a line connecting the centers of said outline circles as does the total depth circle to a line connecting the centers of the outline circles 15—15 at the toe. Thus is determined the total-depth circle 20—20 at the heel end, which necessarily is deeper than the total-depth circle at the heel end of the involute tooth, as is clearly shown in Fig. 2, because the distance upward from a line connecting the centers of the circles 19—19 to the pitch line at the heel is always greater than the distance upward from a line connecting the centers of the circles 15—15 to the pitch line at the toe.

The form of the teeth of the gear at the heel end is determined, with the aid of two small, outline circles 21 which correspond in size with the circles 17, and the centers of which are in no case nearer together than are the centers of the circles 17, in a similar manner to that just described relative to the pinion teeth, whereby the dedendum at the heel of the tooth is found and a total-depth circle 23—23 established.

A line or plane extending between the total-depth circles at the toe and heel of any tooth slot determines the cutting angle. This cutting angle is usually different from the accepted cutting angle of the generated-tooth condition, and it is usually necessary in cutting to tip either the blank or the cutting tool, or both, more than under normal or generating conditions; there might be cases, however, where the tipping of either or both members would be less than under generating conditions.

In cutting any bevel gear in accordance with my lay-out therefor, the cutting portion of the tool is shaped in cross section to conform to the shape of the tooth slot at the toe end in the lay-out, and said tool and the blank to be cut are set relatively so that the tool conforms to the cutting angle. Due to this formation and angular positioning of the tool, said tool cuts and sinks deeper at the heel end of the slot than it does at the toe end. This is necessary because the width of the space at the heel end of the slot is greater (wider) than that of the space at the toe end of said slot, and the tool must cut through between the points on the pitch circle which represent the width thereof of the space between the teeth at the heel end, as well as through between the points on the pitch circle which represent the width thereof of the space between the teeth at the toe end.

The face angle 6—6 of the tooth is determined by a line drawn from the high point on the outside diameter of the toe to the high point on the outside diameter of the heel.

The centers of the outline circles 15 and 19 of the pinion 1 are on circles 24—24 and 25—25, respectively, which latter circles are concentric with the pitch circles 9 and 10 and the total-depth circles 16 and 20; and the centers of the outline circles 17 and 21 of the gear 2 are on circles 26—26 and 27—27, respectively, which latter circles are concentric with the pitch circles 11 and 12 and the total depth circles 18 and 23.

Although I have described above the usual and generally preferred manner of putting my method into effect and use, it is conceivable that some departure in matters of detail, in addition to those hereinbefore intimated, necessary because of some special or unusual condition or conditions, may be made without violating the spirit of the invention or exceeding the scope of what is claimed.

I claim:

1. A method of laying out single-cut bevel gears consisting in laying down the pitch circles at the toe and heel ends, and the total-depth circle at the toe end, of a developed tooth slot, in approximating the developed-curve outlines with circles which pass through the pitch circle at the toe end, and in applying similar circles at the heel end in a manner to cause them to pass through the normal points of intersection between the sides of the slot and the pitch circles at that end, said total-depth circle at the toe end being constant, but the total-depth circle at the heel end, because its arc between the sides of the slot is approximately equal to the arc of the total-depth circle that is between said sides, at the toe end, being deeper than the normal total-depth circle at said heel end.

2. A method of laying out single-cut bevel gears consisting in establishing pitch circles and determining the generated outlines of a developed tooth slot at the toe and heel ends, and establishing the total-depth circle at the toe end, in approximating with circles the involute outlines at the toe end, which latter circles pass through the points of intersection between said outlines and the pitch circle at the end, and in applying similar outline circles at the heel end in a manner to cause them to pass through the normal points of intersection between said outlines and the pitch circle at that end.

3. The method of laying out single-cut bevel gears consisting in laying out a generated tooth slot at the toe and heel ends, in approximating the generated-curve outlines at the toe end with circles, which outline circles pass through the normal points of intersection between said outlines and said pitch circle at that end, a normal total-depth circle being maintained, in applying similar outline circles at the heel end, and causing them to pass through the normal points of intersection between the sides of said slot and the pitch circle at that end, and in applying a total-depth circle, at the toe end, which has approximately the same relation to said second-named outline circles as does the total-depth circle, at the toe end, to said first-named outline circles, wherefore the total-depth circle is deeper than the normal total depth circle at the heel end.

4. A method of laying out single-cut bevel gears consisting in establishing the pitch circles and determining the generated outlines of a tooth slot at the toe and heel ends, and establishing the total-depth circle at the toe end, in approximating with circles the generated outlines at the toe end, said outline circles passing through the normal points of intersection between said outlines and the pitch circle at that end, and in applying similar circles at the heel end in a manner to cause them to pass through the normal points of intersection between said outlines and the pitch circle at that end, each of the centers of said first-named outline circles being the same distance from the point of intersection between the generated outline and the total-depth circle on the same side with said center as is the companion center, at the toe end, and each of the centers of said second-named outline circles being the same distance from the point of intersection between the generated outline and the total-depth circle on the same side with said last-named center as is the companion center, at the heel end.

5. A method of laying out single-cut bevel gears consisting in developing a generated tooth slot at the toe and heel ends, in approximating the generated-curve outlines at the toe end with circles which pass through the pitch circle at that end, the normal total-depth circle being maintained, and in applying other outline circles at the heel end, and causing them to pass through the normal points of intersection between the sides of said slot and the pitch circle at that end, where the total-depth circle is deeper than the normal total-depth circle, the cutting angle being determined by a line extending between the actual total-depth circles.

6. A single-cut bevel gear each tooth of which is normal with a generated tooth on the pitch circles at the toe and heel ends, and has a dedendum at the toe end which approximates in outline the generated outline, and a dedendum at the heel end which is similar to the approximation of the dedendum at the toe end, but, being normal on the pitch line at that end, extends deeper into the body of the gear than would a generated form, with the result that the cutting angle of the single-cut tooth is angular to the cutting angle of the generated tooth.

7. In a method of laying out single-cut bevel gears, the steps of generating the outlines at the toe and heel ends of a developed tooth slot, maintaining the total-depth circle at the toe end, finding a total-depth circle at the heel end which is different from the normal total-depth circle at that end, and connecting the actual total-depth circles between the sides of said slot with a straight line to determine the cutting angle.

HIRAM D. CROFT.